(12) United States Patent
Nagy

(10) Patent No.: US 8,493,238 B2
(45) Date of Patent: Jul. 23, 2013

(54) DEVICE AND METHOD FOR DETECTING WHEEL AXLES

(75) Inventor: Oliver Nagy, Vienna (AT)

(73) Assignee: Kapsch Trafficcom AG, Vienna (AT)

( * ) Notice: Subject to any disclaimer, the term of this patent is extended or adjusted under 35 U.S.C. 154(b) by 398 days.

(21) Appl. No.: 12/896,796

(22) Filed: Oct. 1, 2010

(65) Prior Publication Data

US 2011/0080307 A1 Apr. 7, 2011

(30) Foreign Application Priority Data

Oct. 1, 2009 (EP) ..................................... 09450186

(51) Int. Cl.
*G08G 1/017* (2006.01)
*G01J 1/00* (2006.01)

(52) U.S. Cl.
USPC ........... 340/937; 340/933; 340/942; 340/555; 340/556; 348/148; 25/336.1; 25/559.29

(58) Field of Classification Search
USPC .......................................................... 340/937
See application file for complete search history.

(56) References Cited

U.S. PATENT DOCUMENTS

| 5,509,082 A | 4/1996 | Toyama et al. |
| 5,537,110 A * | 7/1996 | Iida et al. .................. 340/942 |
| 5,757,287 A | 5/1998 | Kitamura et al. |
| 5,757,472 A | 5/1998 | Wangler et al. |
| 5,771,485 A | 6/1998 | Echigo |
| 5,793,491 A | 8/1998 | Wangler et al. |
| 5,809,161 A | 9/1998 | Auty et al. |
| 5,821,879 A | 10/1998 | Liepmann |
| 5,995,900 A | 11/1999 | Hsiao et al. |
| 6,195,019 B1 * | 2/2001 | Nagura ......................... 340/928 |
| 6,198,987 B1 * | 3/2001 | Park et al. ......................... 701/1 |
| 6,304,321 B1 | 10/2001 | Wangler et al. |
| 6,404,506 B1 | 6/2002 | Cheng et al. |
| 2002/0140924 A1 | 10/2002 | Wangler et al. |
| 2003/0062416 A1 | 4/2003 | Smith et al. |
| 2003/0189500 A1 | 10/2003 | Lim |
| 2007/0228262 A1 | 10/2007 | Cantin et al. |
| 2008/0278365 A1 * | 11/2008 | Klein et al. .................... 342/104 |

FOREIGN PATENT DOCUMENTS

| EP | 1 048 961 A2 | 11/2000 |
| EP | 1 446 678 B1 | 8/2004 |
| JP | 5-143887 | 6/1993 |
| JP | 5-312818 | 11/1993 |

(Continued)

OTHER PUBLICATIONS

Extended European Search Report for corresponding European Patent Application No. 09 450 186.3, dated Mar. 17, 2010, 5pp.

(Continued)

*Primary Examiner* — Donnie Crosland
(74) *Attorney, Agent, or Firm* — Christie, Parker & Hale, LLP

(57) ABSTRACT

The invention relates to the detection of wheel axles of a vehicle on a roadway by means of a sensor, which operates according to the light-section procedure and emits at least one fan of light from a first location along the roadway to project a line of light onto the roadway and a vehicle possibly located thereon, and records this line of light from a second location along the same side of the roadway and detects a wheel axle as soon as the recorded line of light exhibits, in its course emanating from the said side of the roadway, a shift-free change in direction differing from its course when the roadway is empty.

12 Claims, 3 Drawing Sheets

FOREIGN PATENT DOCUMENTS

| | | |
|---|---|---|
| JP | 10-105866 | 4/1998 |
| JP | 11-232587 | 8/1999 |
| JP | 2000-339586 | 12/2000 |
| JP | 2002-183881 | 6/2002 |
| JP | 2008-59260 | 3/2008 |
| WO | WO 03/036319 A2 | 5/2003 |
| WO | WO 2005/017853 A1 | 2/2005 |
| WO | WO 2007/134632 A1 | 11/2007 |

OTHER PUBLICATIONS

Examination Report issued in corresponding New Zealand Patent Application No. 587585, dated Aug. 31, 2010, 2pp.

Examination Report issued in corresponding New Zealand Patent Application No. 587583, dated Aug. 31, 2010, 2pp.

Huelsmann, Axel et al.; "Machine Vision: Laser projections assist machine-vision applications"; Laser Focus World; vol. 43; Issue 5; 2007; 6pp.

Office action issued in corresponding Chilean Patent Application No. 1007-10, dated Sep. 27, 2010, 7pp.

Office action issued in corresponding Chilean Patent Application No. 1009-10, dated Sep. 27, 2010, 6pp.

Office action issued in corresponding European Patent Application No. 09 450 188.9, dated Apr. 11, 2013, 13pp.

Opposition issued in corresponding European Patent Application No. 09 450 188.9, dated Aug. 9, 2012, 14pp.

Opposition issued in corresponding European Patent Application No. 09 450 186.3, dated Apr. 27, 2012, 17 pp.

European Search Report for corresponding European patent application No. 09 450 188.9, dated Dec. 28, 2009, pp. 4.

He et al., "A Novel Algorithm for Estimating Vehicle Speed from Two Consecutive Images", IEEE Workshop on Applications of Computer Vision (WACV'07), The Computer Society, 2007, pp. 6.

* cited by examiner

DEVICE AND METHOD FOR DETECTING WHEEL AXLES

CROSS-REFERENCE TO RELATED APPLICATION(S)

This application claims priority to European Patent Application No. 09 450 186.3, filed on Oct. 1, 2009, the contents of which are hereby expressly incorporated by reference.

FIELD OF THE INVENTION

The present invention relates to a device and a method for detecting wheel axles of a vehicle on a roadway.

BACKGROUND

The detection of vehicle wheel axles is of importance in numerous applications. For instance, travel on a specific traffic surface can be reliably determined from the detection of a wheel axle, e.g. for border crossing or for activation of specific actions such as triggering an alarm, switching on a lighting system, opening a barrier, taking a photograph for monitoring purposes etc. Modern traffic payment systems are also frequently directed towards the number of axles of vehicles to assess charges, so that the detection of wheel axles can also be an important basis for road toll or parking fee systems.

A wide variety of systems are currently used for the detection of wheel axles, such as induction loops embedded into the roadway, light barriers just above the roadway or radar or laser scanners over the roadway, which also detect wheel axles as part of vehicle contour recognition. What all the known systems have in common is that they are extremely expensive, for example, induction loops require the surface of the roadway to be opened up, light barriers require installations on both edges of the roadway and are ineffective on roads with multiple lanes, and radar or laser scanners are structurally complex and costly.

SUMMARY

The present invention provides devices and methods for detecting wheel axles that are easier to achieve than the known solutions.

In a first aspect of the invention, a device distinguished by a sensor, operates according to the light-section procedure and emits at least one fan of light from a first location along the roadway to project a line of light onto the roadway and a vehicle possibly located thereon, and records this line of light from a second location along the same side of the roadway and detects a wheel axle as soon as the recorded line of light exhibits, in its course emanating from the said side of the roadway, a shift-free change in direction differing from its course when the roadway is empty.

In this way, the light-section procedure known in the art is used for the first time for wheel axle detection. In the light-section procedure a line of light projected onto a surface relief at a first angle is viewed from a different second angle and thus delineates the surface relief in a section ("light section"), which is utilised here for a particularly simple wheel axle detection. If no vehicle is located on the roadway, the image of the line of light shows a substantially continuous line; if there is a vehicle located on the roadway, whose wheel support points (and therefore wheel axles) on the roadway are directly hit by the line of light, the line of light undergoes a change in direction in the image recording (appears "bent"); however, if a vehicle is located on the roadway, whose wheel support points (and therefore wheel axles) are not directly at the location of the line of light, so that the laterally incident line of light illuminates at least partially below the vehicle, the image of the line of light appears bent and shifted in the recording, i.e. also undergoes a shift in its change of direction at the location. However, only the course of a single line of light in a recorded image needs to be monitored for this criterion in order to detect wheel axles, which is possible with very simple image processing means. The device of the invention does not require any installations in the roadway whatsoever, can be mounted on only a single side of the roadway and compared to radar or laser scanning systems, only requires very simple light projection, camera and image processing means.

In some embodiments, the sensor comprises a light projector at the first location and a separately disposed camera at the second location, as a result of which a sufficient difference in angle can be generated between the direction of projection and recording.

The light projector may be a laser or a light-emitting diode emitter, as a result of which high luminances can be achieved.

The light projector may operate in a narrow-band light frequency range, for example, in the infrared or ultraviolet range.

The invention also provides the possibility of using an already existing traffic monitoring camera as the camera, which further reduces the structural expense.

The sensor may also project and record multiple parallel lines of light in order to detect multiple wheel axles simultaneously. As a result, wheel axles on stationary vehicles can also be detected, for example, or wheel axles of one or more vehicles moving one after the other on the roadway can be detected in a single step.

The angle of the line or lines of light to the roadway can be variably selected. Combinations of multiple lines of light that have no parallel course are likewise conceivable.

If desired, the sensor can additionally project and record lines of light crossed in a grid shape in order to determine the surface contour of a vehicle therefrom in a manner known per se. As a result, a vehicle classification can also be conducted for monitoring or toll charging purposes.

In a second aspect, the invention is a method comprising: projecting at least one fan of light from a first location along the roadway in order to project a line of light onto the roadway and a vehicle possibly located thereon; recording the line of light from a second location along the same side of the roadway; and detecting a wheel axle as soon as the recorded line of light exhibits a shift-free change in direction differing from its course when the roadway is empty.

Reference is made to the above explanations for the device with respect to the advantages and further features of the method according to the invention. The fan of light may be stationary and the vehicle may be moving. Alternatively, the vehicle may be stationary and the fan of light may be moving.

BRIEF DESCRIPTION OF THE DRAWINGS

The invention shall be explained in more detail below on the basis of exemplary embodiments illustrated in the attached drawings.

DETAILED DESCRIPTION

Figure 1:
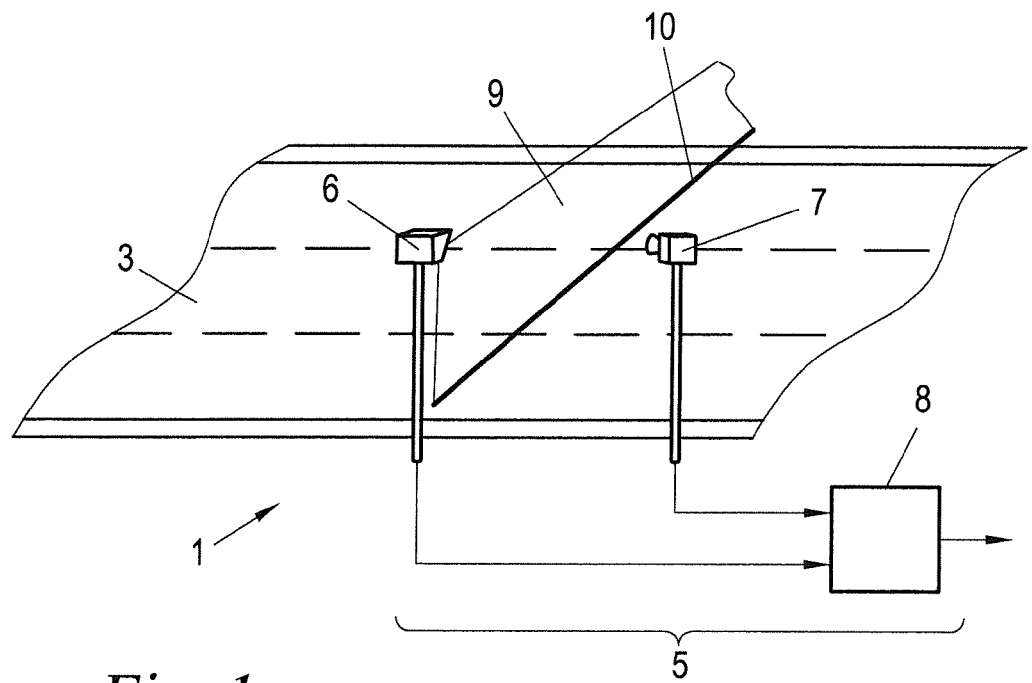
FIGS. 1 to 3 show the device and the method of the invention during the passage of a vehicle on a roadway in three different phases.
Figure 2:
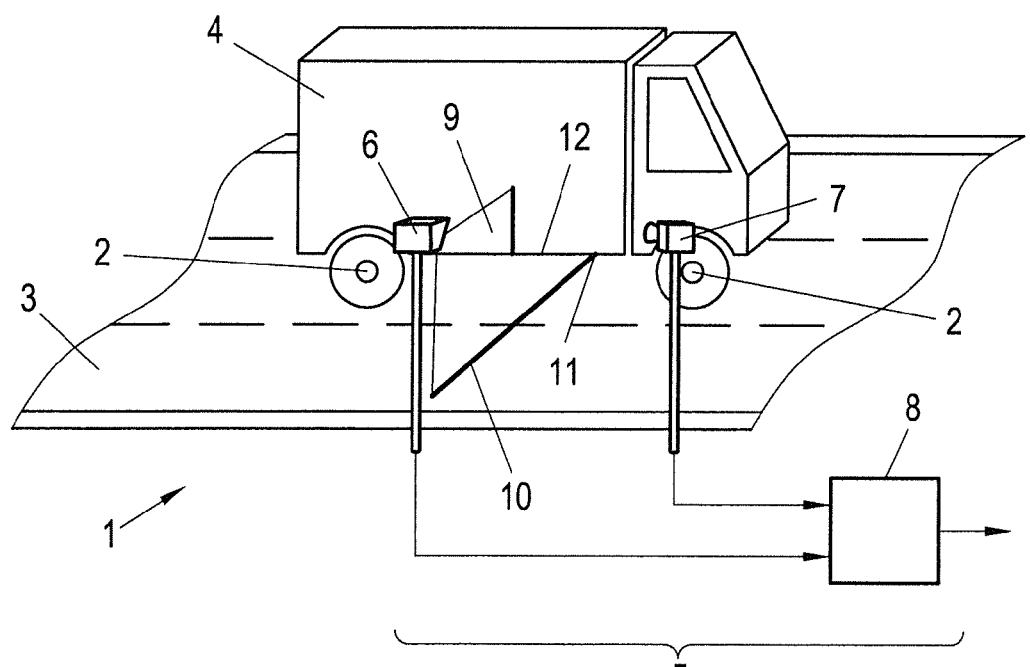
Figure 3:
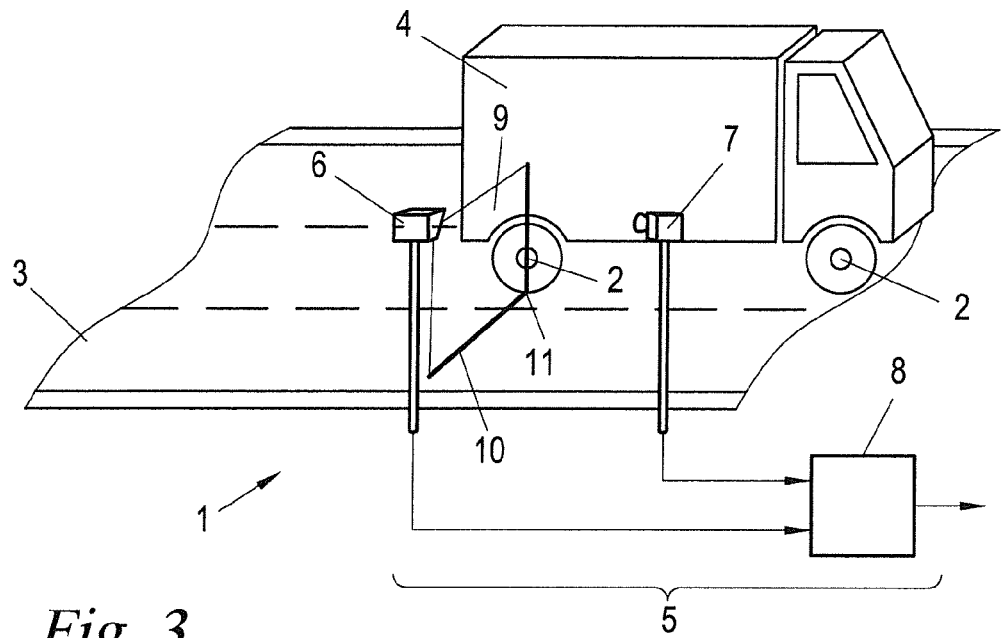

FIGS. 1 to 3 show a device 1 for detecting wheel axles 2 of a vehicle 4 travelling on a roadway 3. The device 1 has a sensor 5 operating according to the light-section procedure, which is arranged at the edge of the roadway or above the roadway 3 and comprises a light projector 6, a camera 7 and an evaluation unit 8 connected thereto.

The vehicle 4 can be of any type, also a combination of a prime mover and a trailer is covered by the term "vehicle" used here. The device 1 can be both fixed and portable in configuration.

The light projector 6 projects a line of light 10 onto the surface of the roadway 3 from a first location laterally and above the roadway 3 by means of a fan of light 9. The camera 7 looks onto the surface of the roadway from a second location along the same side of the roadway 3, i.e. from a location that does not in any case lie in the plane of the fan of light 9, e.g. laterally and above the roadway 3 and spaced from the first location in the longitudinal direction of the roadway, to take an image of the line of light 10 at a different angle from the projection angle. If the roadway 3 is empty, the image of the line of light 10 taken by the camera 7 is a continuous line (FIG. 1).

When a vehicle 4 passes the sensor 5, the line of light 10 in the image recorded by the camera 7 appears "bent" in a different manner, i.e. depending on whether the fan of light 9 strikes the vehicle 4 next to (FIG. 2) or at the location of a wheel axle 2 (FIG. 3). At the location of a wheel axle 2 the image of the line of light 10—viewed in its course from the roadway side of the sensor 5—shows a "shiftless" change in direction 11, see FIG. 3, whereas—because of the sloping illumination of the vehicle 4 by the light projector 6—the line of light 10 next to the wheel axles 2 illuminates slightly below the vehicle 4. As a result, the image of the line of light 10 simultaneously shows a displacement (shift) 12 at the location of the change in direction, see FIG. 2.

These line forms can be detected in the image taken by the camera 7 by the evaluation unit 8 with relatively simple image processing means and can be used as criterion for the presence of a wheel axle 2. If the image of the line of light 10 shows a "shiftless" change in direction according to FIG. 3 in its course, viewed from the roadway side of the sensor 5, this is evaluated as the presence of a wheel axle 2.

Any type of light source that is able to emit light in line form or a fan of light 9, e.g. by means of diaphragms, mirrors, lenses or combinations thereof, can be used as light projector 6. Laser diode emitters, whose light is spread laterally with a lens or diaphragm, for example, or emitters composed of groups of high-performance light-emitting diodes, are particularly suitable for this.

To also improve the contrast of the line of light 10 produced by the light projector 6 in unfavourable ambient light conditions, e.g. direct sunlight, the light projector 6 can be optionally operated in a pulsed manner with high pulse peak power, wherein the camera 7 then only needs to be operated at the times of the light pulses of the light projector 6.

The camera 7 can be any photographic or video camera. A traffic monitoring camera already existing on the roadway 3 is preferably used as camera, e.g. a camera of a road toll station intended for recording toll offences.

Figure 4:
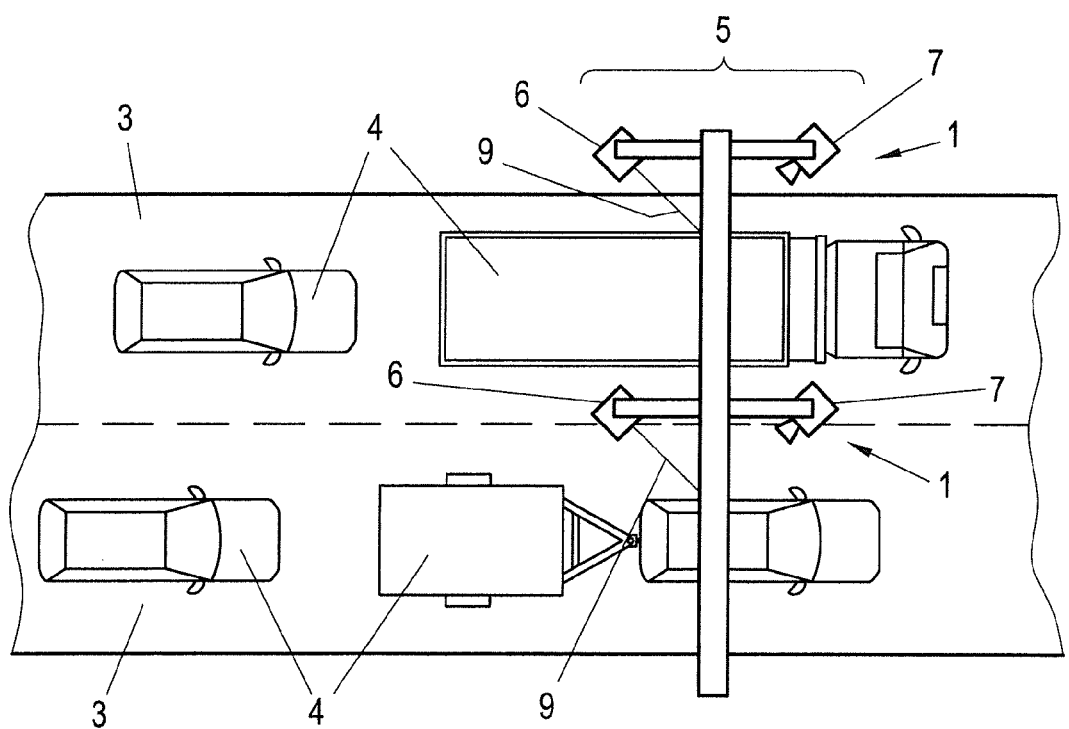
FIG. 4 shows a second embodiment of the invention for multiple road lanes located next to one another.

FIG. 4 shows an application of the device and method of FIGS. 1 to 3 on a road having multiple roadways 3 in the form of adjacent lanes. Each of the road lanes 3 has its own device 1, which is mounted eccentrically, i.e. slightly laterally above the road lane 3, and is therefore able to emit one or more fans of light 9 from obliquely above onto the roadway surface and the passing vehicles 4. It is thus possible to detect for each road lane 3 whether the line of light 10 striking the surface of the roadway 3 is bent without a break or not by passing wheel axles 2.

Figure 5:
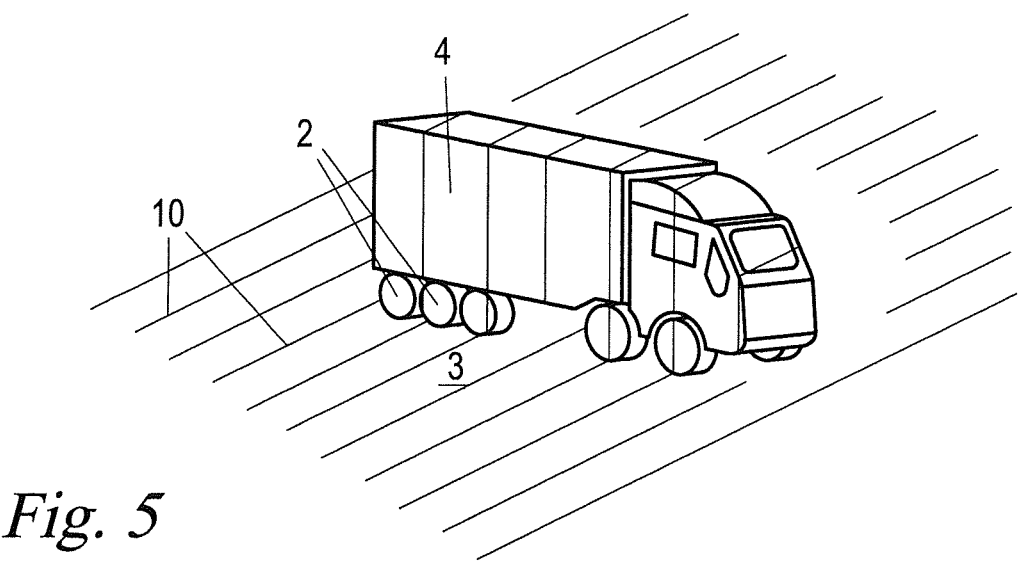
FIG. 5 shows a third embodiment of the invention using a fringe projection.

FIG. 5 shows a further embodiment with one or more light projectors that can project multiple parallel fans of light 9 and thus lines of light 10 onto the surface of the roadway 3. As a result, multiple wheel axles 2 can be detected simultaneously with the very same camera. The use of such a projection pattern comprising parallel lines of light is also known in the light-section technique as fringe projection.

Figure 6:
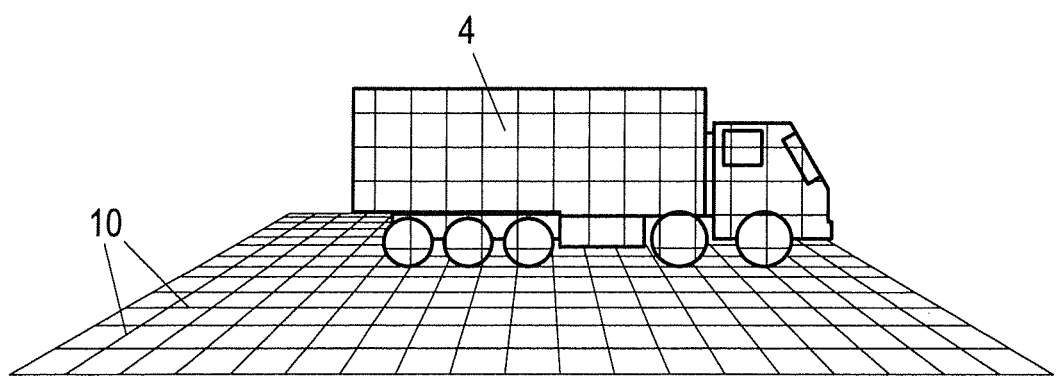
FIG. 6 shows a fourth embodiment of the invention using a grid projection.

In the variant of FIG. 6, in place of a line pattern of light, a grid of crossed lines of light 10 is projected and recorded, as a result of which the entire surface contour (3D relief) of the vehicles 4 can also be determined from the distortions of the grid of light by the passing vehicles, as is known to the person skilled in the art. The thus determined surface contour of the vehicles can be used for the classification of vehicles, for example.

The invention is not restricted to the illustrated exemplary embodiments, but covers all variants and modifications that come within the framework of the attached claims.

What is claimed is:

1. A device for detecting a wheel axle of a vehicle on a roadway comprising:
   a light projector configured to operate according to the light-section procedure and emit at least one fan of light from a first location along a side of the roadway to project a line of light onto the roadway and a vehicle located thereon;
   a camera configured to record said line of light from a second location along the same side of the roadway; and
   an evaluation unit coupled to the camera and configured to determine a course of the line of light from the second location and to detect the wheel axle of the vehicle when the recorded line of light from the second location exhibits, in its course emanating from said side of the roadway, a shift-free change in direction differing from a reference course when the roadway is empty.

2. The device according to claim 1, wherein the light projector is configured to emit light in a narrow-band light frequency range in the infrared or ultraviolet range.

3. The device according to claim 1, wherein the light projector is a laser or a light-emitting diode.

4. The device according to claim 1, wherein the camera is a traffic monitoring camera.

5. The device according to claim 1, wherein the light projector is configured to project and the camera is configured to record multiple parallel lines of light for the evaluation unit to detect multiple wheel axles simultaneously.

6. The device according to claim 5, wherein the light projector is additionally configured to project and the camera is configured to record lines of light crossed in a grid shape for the evaluation unit to determine a surface contour of the vehicle therefrom.

7. A method for detecting a wheel axle of a vehicle on a roadway, comprising:
   projecting at least one fan of light from a first location along a side of the roadway to project a line of light onto the roadway and a vehicle located thereon;

recording the line of light from a second location along the same side of the roadway; and detecting the wheel axle when the recorded line of light exhibits a shift-free change in a direction differing from a reference course when the roadway is empty.

8. The method according to claim 7, wherein the line of light is stationary and the vehicle is moving.

9. The method according to claim 7, wherein the vehicle is stationary and the line of light is moving.

10. The method according to claim 7, wherein multiple parallel lines of light are projected and recorded to detect multiple wheel axles simultaneously.

11. The method according to claim 10, wherein lines of light crossed in a grid shape are additionally projected and recorded to determine a surface contour of the vehicle therefrom.

12. The method according to claim 7, further comprising charging wheel axle number-dependent tolls for the vehicle.

* * * * *